United States Patent
Davancens et al.

(10) Patent No.: US 10,201,832 B2
(45) Date of Patent: Feb. 12, 2019

(54) METHODS FOR DISPENSING A SUBSTANCE ON A SURFACE

(71) Applicant: The Boeing Company, Chicago, IL (US)

(72) Inventors: Angelica Davancens, Reseda, CA (US); Branko Sarh, Huntington Beach, CA (US); Don D. Trend, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 951 days.

(21) Appl. No.: 14/291,216

(22) Filed: May 30, 2014

(65) Prior Publication Data

US 2015/0343487 A1    Dec. 3, 2015

(51) Int. Cl.
| | |
|---|---|
| *B05C 1/02* | (2006.01) |
| *B05D 1/26* | (2006.01) |
| *B05C 5/02* | (2006.01) |
| *B05C 11/10* | (2006.01) |

(52) U.S. Cl.
CPC ............... *B05D 1/26* (2013.01); *B05C 1/02* (2013.01); *B05C 5/0216* (2013.01); *B05C 11/1005* (2013.01); *B05C 11/1007* (2013.01)

(58) Field of Classification Search
None
See application file for complete search history.

(56) References Cited

U.S. PATENT DOCUMENTS

| | | | |
|---|---|---|---|
| 4,778,642 A | * | 10/1988 | Lee .................... B05C 11/06 118/62 |
| 5,336,349 A | | 8/1994 | Cornils et al. |
| 2006/0144331 A1 | * | 7/2006 | Hanafusa .............. B01L 3/0268 118/712 |
| 2010/0007733 A1 | | 1/2010 | Bachem et al. |

(Continued)

FOREIGN PATENT DOCUMENTS

| | | |
|---|---|---|
| CN | 101669060 A | 3/2010 |
| DE | 102011011545 A1 | 8/2012 |

OTHER PUBLICATIONS

A. Razban, G.F. Bryant and B.L. Davies, "Dynamic Modelling and Control Simulation of Automatically Dispensed Adhesive Beads", Imperial College, U.K., 0-7803-0582-5 192s3.00@1992 IEEE.

(Continued)

*Primary Examiner* — Nathan H Empie
(74) *Attorney, Agent, or Firm* — Joseph F. Harding; The Small Patent Law Group LLC

(57) ABSTRACT

A method of dispensing a substance along a path is provided. The method includes supplying the substance to a dispenser. The method also includes moving the dispenser along a virtual travel plane parallel to the path and passing through two contact points of the dispenser, while maintaining a contact portion of the dispenser in communication with a surface. The method also includes monitoring a leading portion of the bead and generating a signal responsive to at least one characteristic of the leading portion. The method further includes controlling at least one of the speed of the dispenser along the path or the flow rate of the substance to the dispenser to provide a substantially uniform cross-sectional shape of the bead along the path.

38 Claims, 10 Drawing Sheets

(56) References Cited

U.S. PATENT DOCUMENTS

2010/0180711 A1 7/2010 Kilibarda et al.
2012/0199064 A1 8/2012 Foy

OTHER PUBLICATIONS

A. Razban, O.S. Sezgin, and B.L. Davies, Real Time Control Automated Adhesive Dispensing, Imperial College of Science, Technology and Medicine, U.K., Software Engineering for Real Time Systems, 1991., Third International Conference.
John E. Agapakis and Jon Boistad, "A Vision Sensing and Processing System for Monitoring and Control of Welding and Other High Luminosity Processes", SPIE vol. 1385 Opticss, Illumination, and Image Sensing for Machine Vision V (1990).
Extended European Search Report for EP Application No. 15169238.1-1757.
Search Report for corresponding Chinese Application No. 201510192527.3 dated Aug. 2, 2018. (8 pages).

* cited by examiner

METHODS FOR DISPENSING A SUBSTANCE ON A SURFACE

BACKGROUND

When dispensing a substance, such as a sealant, onto a surface of, e.g., an aircraft part or aircraft assembly in an automated manner, it is often important to control one or more properties, such as the profile or shape, of the dispensed bead.

For substances having a consistent viscosity, a desired bead shape may be achieved by controlling the flow rate of the substance, e.g., with one or more flow meters. However, flow meters may cause interference with the dispensing process and may be difficult to clean, especially when working with substances having short cure times.

For substances with variable viscosities, achieving uniform application onto a surface by controlling the flow rate may not be possible. For example, the viscosities of certain substances may change based on factors, such as temperature, pressure, compressibility, cure time, etc. Because of these factors, controlling the properties of the dispensed beads of such substances is difficult by conventional means, discussed above, which may result in either excess amounts of the substance being dispensed, thereby wasting material, and increasing weight, and/or failing to meet specification or insufficient amounts of the substance being dispensed, resulting, for example, in a seal which is out of specification. Sealed joints that are out of specification must be reworked, which substantially increases manufacturing cycle time and associated costs.

SUMMARY

Accordingly, systems and methods for dispensing a substance in a form of a bead on a surface, intended to address the above-identified concerns, could find utility.

One example of the present disclosure relates to a system for dispensing a substance in a form of a bead on a surface in a progression direction along a path. The system includes a dispenser comprising, while the substance is being dispensed: a leading edge, a contact portion including two contact points with the surface, and a trailing edge that extends between the two contact points and terminates therein. The system also includes first means for moving the dispenser along a virtual travel plane, which is parallel to the path and passes through the two contact points, while maintaining the contact portion in communication with the surface as the substance is being dispensed. The system also includes second means for monitoring a leading portion of the bead and for generating a signal responsive to at least one characteristic of the leading portion, wherein the leading portion is located ahead of a portion of the leading edge in the progression direction along the path. The system further includes third means for controlling, responsive to the signal generated by the second means, at least one of a speed of the dispenser along the path or a flow rate of the substance to the dispenser to provide a substantially uniform cross-sectional shape of the bead along the path.

One example of the present disclosure relates to a method of dispensing a substance in a form of a bead on a surface in a progression direction along a path. The method includes supplying the substance to a dispenser, wherein, while the substance is being dispensed, the dispenser comprises a contact portion including two contact points with the surface, a leading edge, and a trailing edge extending between the two contact points and terminating therein. The method also includes moving the dispenser along a virtual travel plane which is parallel to the path and passes through the two contact points, while maintaining the contact portion of the dispenser in communication with the surface as the substance is being dispensed. The method further includes monitoring a leading portion of the bead and generating a signal responsive to at least one characteristic of the leading portion, wherein the leading portion is located ahead of a portion of the leading edge in the progression direction along the path. The method additionally includes controlling, responsive to the signal generated responsive to the at least one characteristic of the leading portion, at least one of a speed of the dispenser along the path or a flow rate of the substance to the dispenser to provide a substantially uniform cross-sectional shape of the bead along the path.

BRIEF DESCRIPTION OF THE DRAWINGS

Figure 1:
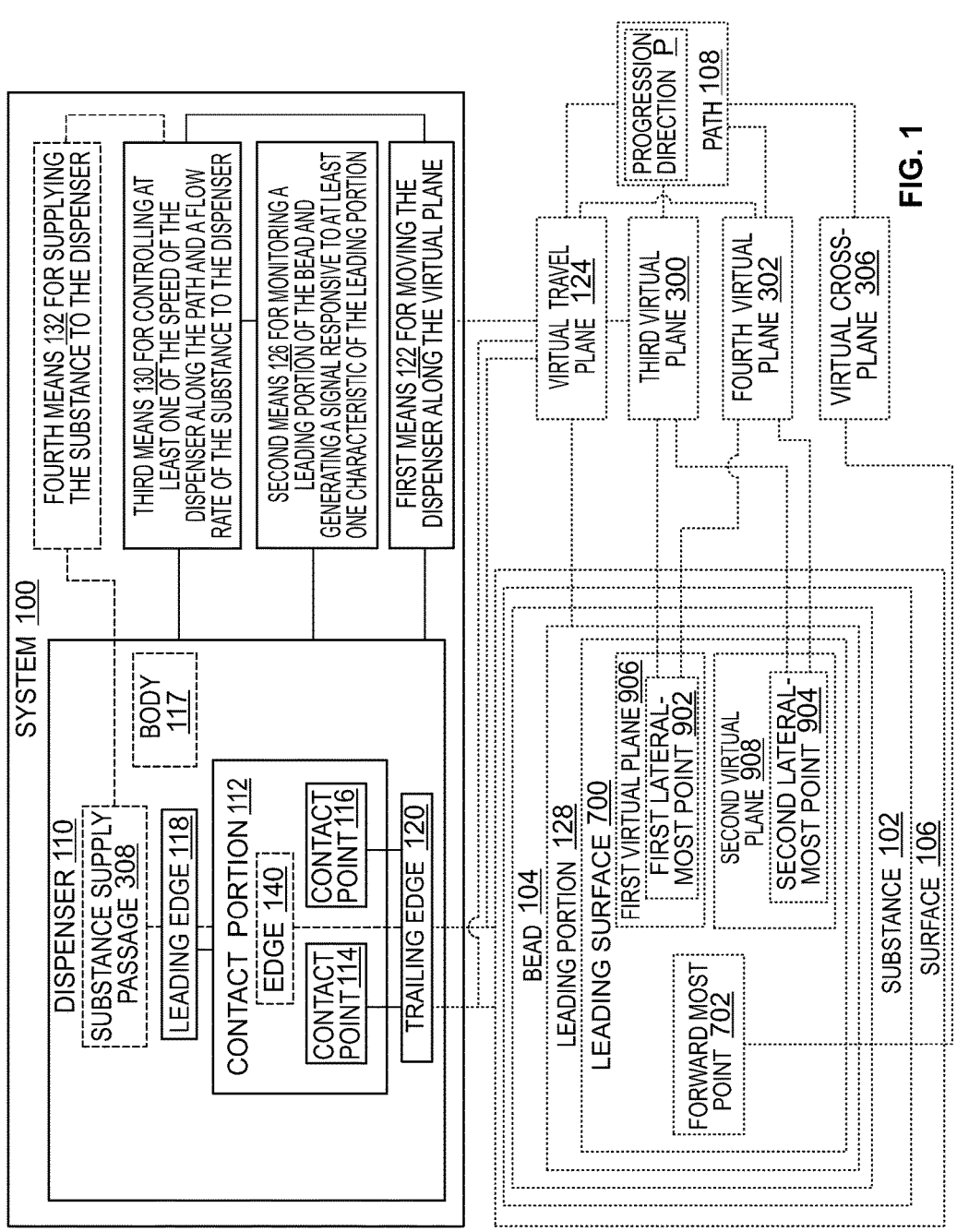
Figure 2:
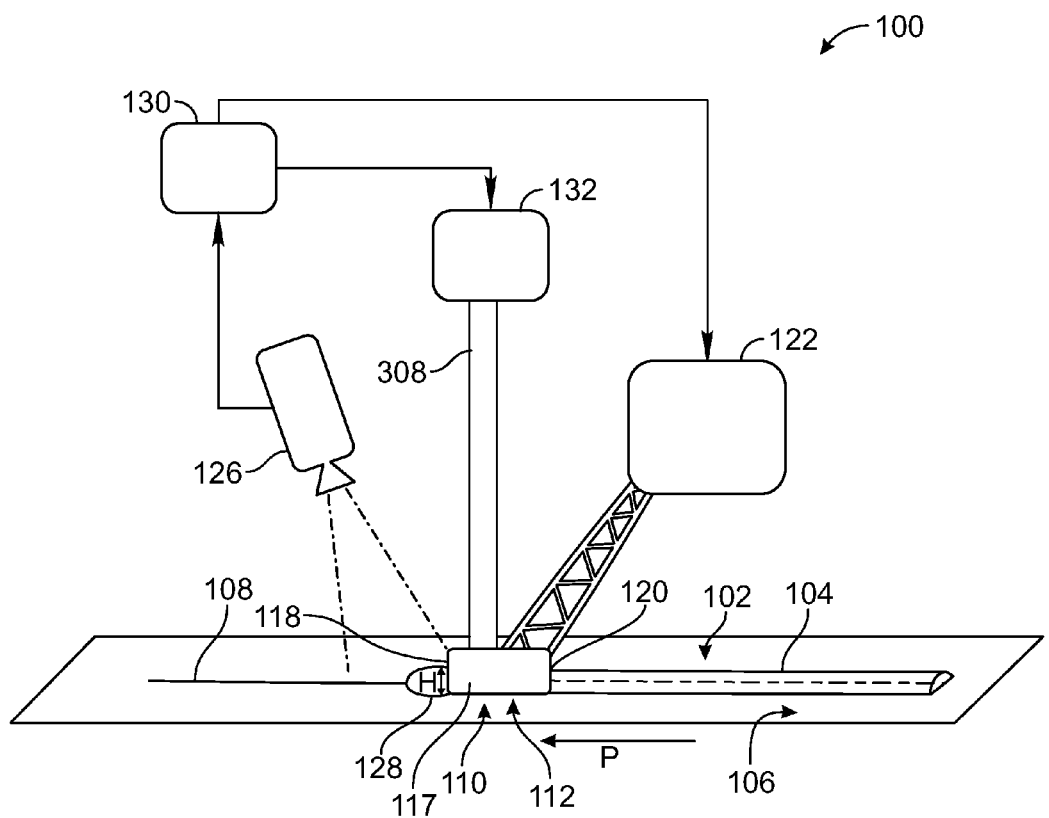
Figure 7:
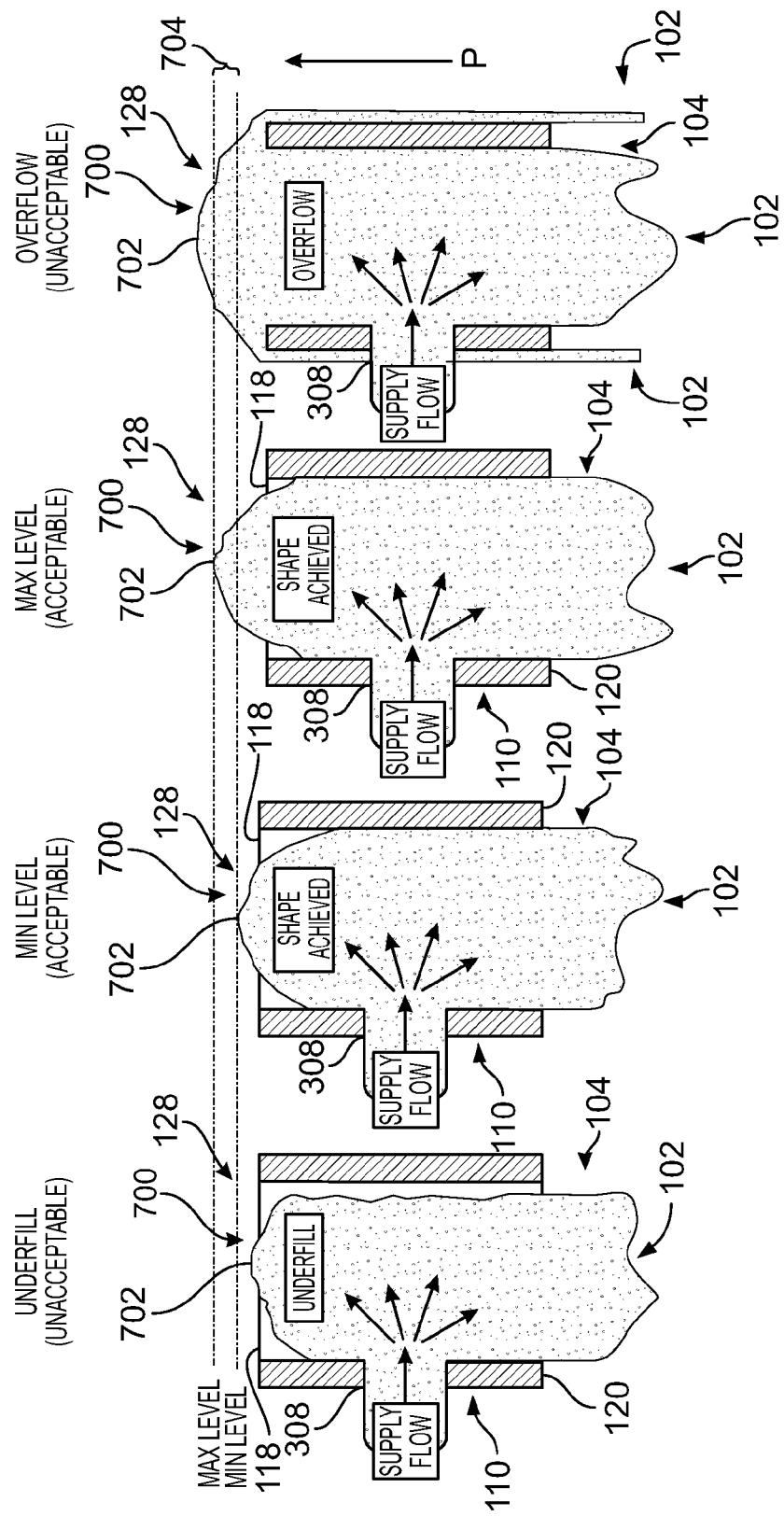
Figure 8:
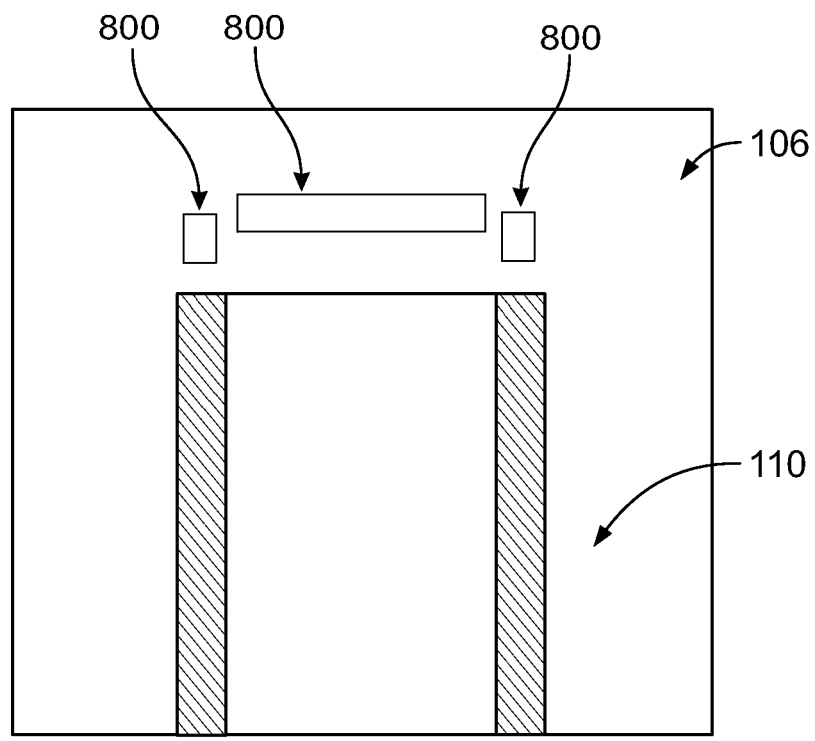
Figure 9:
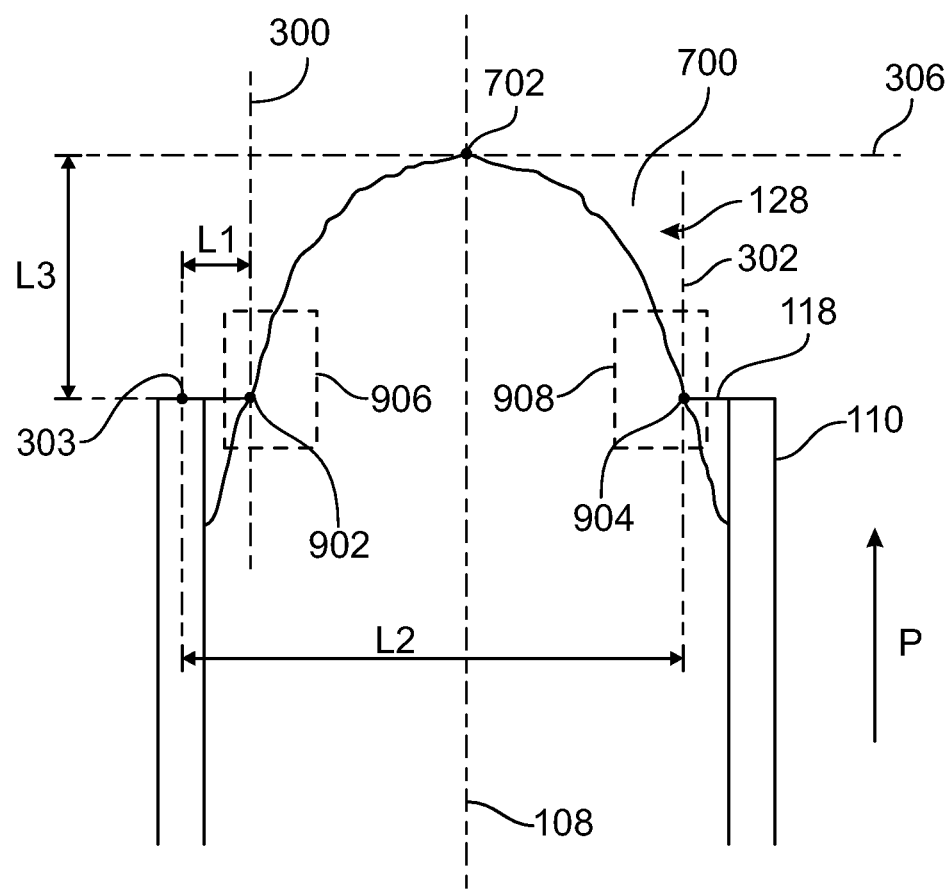
Figure 10:
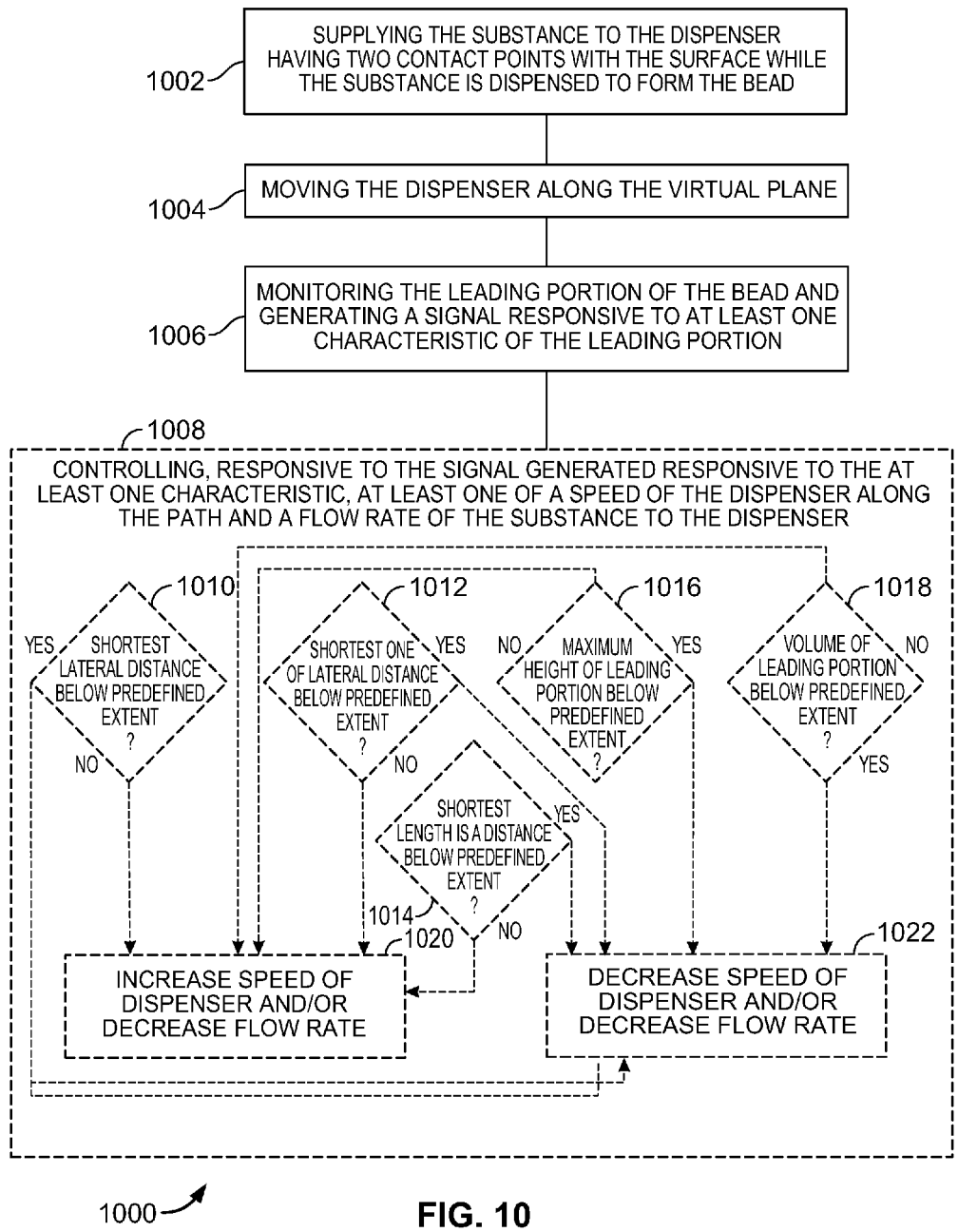
Figure 11:
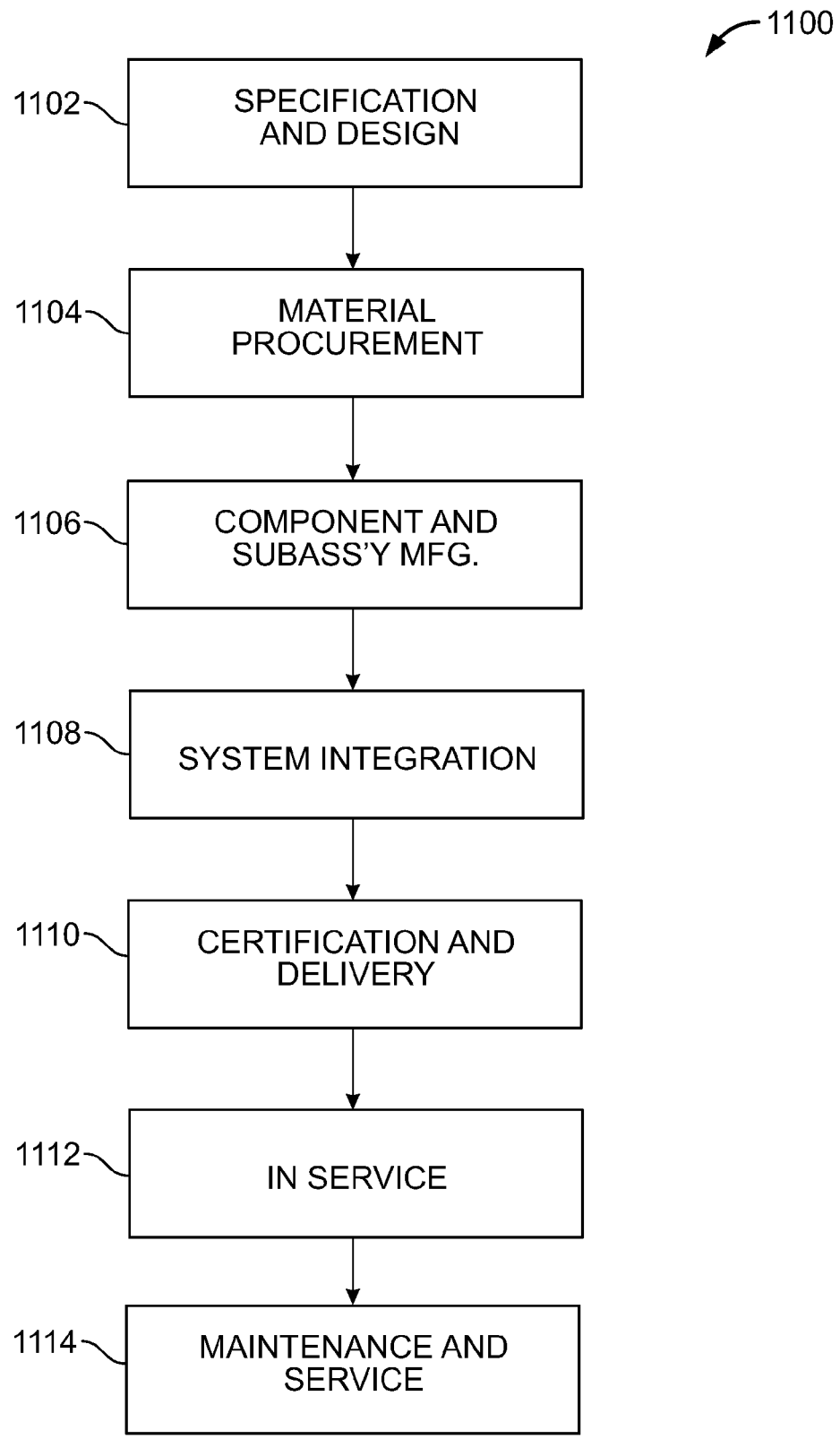

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a system for dispensing a substance in a form of a bead on a surface, according to one aspect of the disclosure;

FIG. 2 is a schematic illustration of the system of FIG. 1, according to one aspect of the disclosure;

FIGS. 3-6 are schematic perspective views of various examples of a dispenser of the system of FIGS. 1 and 2, according to aspects of the disclosure;

FIG. 7 illustrates schematic sectional views of the dispenser shown in FIGS. 1 and 2, illustrating control of bead formation according to one aspect of the disclosure;

FIG. 8 illustrates schematic top perspective views of the dispenser, shown in FIGS. 1 and 2, and monitored regions, according to aspects of the disclosure;

FIG. 9 is a bottom schematic view illustrating a dispenser of the system of FIGS. 1 and 2, illustrating virtual planes according to an aspect of the disclosure;

FIG. 10 is a block diagram of a method of using the system of FIGS. 1 and 2 to dispense a substance, according to one aspect of the disclosure;

FIG. 11 is a block diagram of aircraft production and service methodology; and

Figure 12:
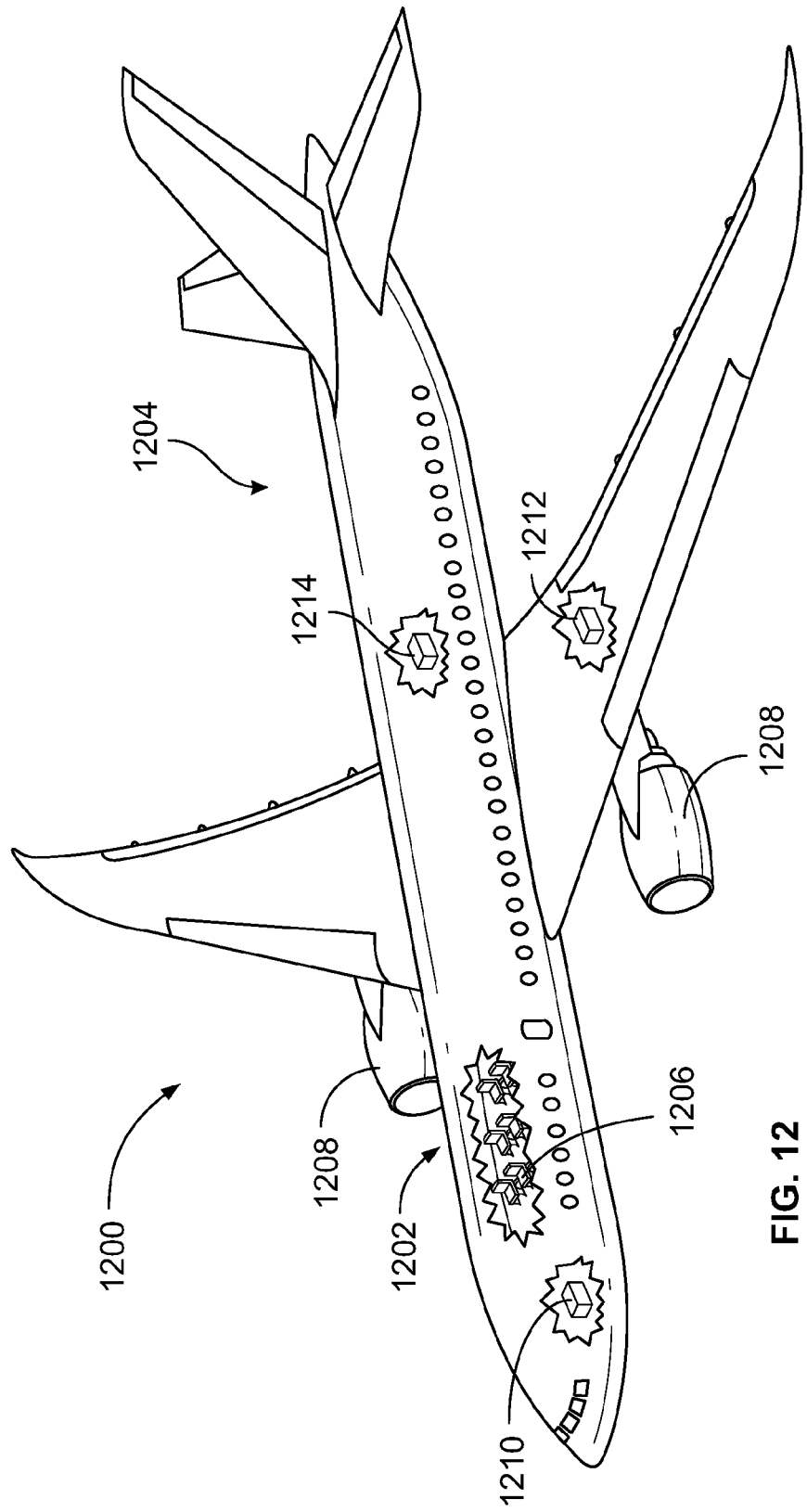

FIG. 12 is a schematic perspective view of an aircraft.

In FIG. 1, referred to above, solid lines connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even through such combination or combinations are not explicitly illustrated herein. Similarly, additional features not limited to the examples presented, may be combined with some or all of the features shown and described herein.

In FIG. 10, referred to above, the blocks may represent operations and/or portions thereof and lines connecting the various blocks do not imply any particular order or dependency of the operations or portions thereof. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring generally to FIGS. 1-6, and with particular reference to FIGS. 1 and 2, one example of the present disclosure relates to a system 100 for dispensing a substance 102 in a form of a bead 104 on a surface 106 in a progression direction (illustrated by the arrow "P") along a path 108. The system 100 includes a dispenser 110 having, while the substance 102 is being dispensed: a leading edge 118, a contact portion 112 including two contact points 114, 116 (shown in FIGS. 3-6) with the surface 106, and a trailing edge 120 that extends between the two contact points 114, 116 and terminates therein. The system 100 also includes first means 122 for moving the dispenser 110 along a virtual travel plane 124 (shown in FIGS. 3-6), which is parallel to the path 108 and passes through the two contact points 114, 116, while maintaining the contact portion 112 in communication with the surface 106 as the substance 102 is being dispensed. The system 100 further includes second means 126 for monitoring a leading portion 128 of the bead 104 and for generating a signal responsive to at least one characteristic of the leading portion 128, wherein the leading portion 128 is located ahead of a portion of the leading edge 118 in the progression direction P along the path 108. The system 100 additionally includes third means 130 for controlling, responsive to the signal generated by the second means 126, at least one of a speed of the dispenser 110 along the path 108 or a flow rate of the substance 102 to the dispenser 110 to provide a substantially uniform cross-sectional shape of the bead 104 along the path 108. It may be noted that, in some circumstances, such as an underfill condition, the leading portion 128 may not reach and/or extend past the leading edge 118; however, the absence of the leading portion 128 ahead of the leading edge 118 may also be monitored and/or provide a characteristic of the leading portion 128 responsive to which a signal may be generated.

In one aspect of the disclosure, which may include at least a portion of the subject matter of any of the preceding and/or following examples and aspects, the system 100 includes fourth means 132 for supplying the substance 102 to the dispenser 110.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item. As used herein, the first means 122, the second means 126, the third means 130, and the fourth means 132 are to be interpreted under 35 U.S.C. 112(f), unless otherwise explicitly stated. It should be noted that examples provided herein of any structure, material, or act in support of any of the means-plus function clauses, and equivalents thereof, may be utilized individually or in combination. Thus, while various structures, materials, or acts may be described in connection with particular a means-plus-function clause, any combination thereof or of their equivalents is contemplated in support of such means-plus-function clause.

In one aspect of the disclosure, which may include at least a portion of the subject matter of any of the preceding and/or following examples and aspects, the system 100 is configured to dispense one or more different types of substances, such as the substance 102, onto the surface 106. For example, the fourth means 132 supplies the substance 102 to the dispenser 110 based on the particular requirements of a given application, including the properties or characteristics of the desired end product (e.g., a seal to be formed). In some examples, the substance 102 may be a Newtonian fluid or a non-Newtonian fluid. In other examples, the substance 102 may be a paste or sealing agent, such as a sealer used in the aircraft industry. In some examples, the substance 102 is a material that does not have a consistent viscosity while being dispensed. The substance 102 may be any material suitably dispensed by the dispenser 110 onto the surface 106. Those skilled in the art will appreciate that many other examples of the substance 102 may be contemplated. One or more aspects of the disclosure are directed to controlling the dispensing of the substance 102 when the substance 102 does not have, e.g., a consistent viscosity, such that a substantially uniform cross-sectional shape of the bead 104 on the surface 106 is achieved along the path 108 without an overflow of the substance 102 onto the surface 106 and without underfilling of the bead 104.

The fourth means 132 may be any device that allows for supplying of the substance 102 to the dispenser 110. For example, the fourth means 132 may include a storage portion, such as a container, that maintains an amount of the substance 102 that is allowed to flow to the dispenser 110, which flow rate may be controlled by the third means 130. The fourth means 132 may be a vessel or holding area having different shapes and sizes for storing the substance 102 for a time period prior to and as the substance 102 is being dispensed. For example, a portion of the fourth means 132 may be removably coupled to the dispenser 110 such that a portion of the fourth means 132 may be refilled or replaced to provide additional substance 102 as desired or needed. The fourth means 132 may include, for example, a container, enclosure, bottle, or the like that has a determined or defined amount of the substance 102 therein. In one aspect, different containers, for example, may be separately provided having different substances 102 therein. Those skilled in the art will appreciate that the fourth means 132, including the portion thereof that stores the substance 102 may be formed from any suitable material (e.g. plastic or metal) based on the particular substance to be held or stored therein. In one or more aspects, the fourth means 132 may include a mix-on-demand dispensing system where the constituents of the substance to be dispensed are supplied for mixing from one or more remote locations via tubing, piping, or the like.

Thus, the fourth means 132 may form part of (e.g., a chamber within) or be coupled to the dispenser 110. The fourth means 132 may include a substance supply passage 308 that allows for passage of the substance 102 through the dispenser 110 and to the surface 106. The fourth means 132 is configured to allow controllable flow of the substance 102 to the dispenser 110.

The third means 130 may be any device or combination of devices that control the at least one of the speed of the dispenser 110 along the path 108 or the flow rate of the substance 102 to the dispenser 110 as supplied by the fourth means 132. For example, the third means 130 may be a controller (or control portion) with a motorized device or component that has an adjustable speed that allows for varying the speed at which the dispenser 110 is moved along the path 108. The third means 130 may include limiters to define or set the maximum speed at which the dispenser 110 is allowed to move, which may be based in part of the substance 102 being dispensed. In one aspect, the third means 130 includes a drive arrangement that is controllable to change the speed of the dispenser 110 along the path 108. The third means 130 may provide an incrementally varying speed control or continuously varying speed control, which may be determined, for example, based on the type of motor being used.

Additionally or alternatively, the third means 130 also may include a controller (or control portion) that allows for varying the flow rate of the substance 102 to the dispenser 110. For example, the third means 130 may include a valve or other regulator that is controllable to incrementally vary or continuously vary the amount of substance 102 allowed to pass thereby, which controls the amount of flow of the substance 102 to the dispenser 110. The third means 130 may include any mechanism capable of opening and closing, such as to varying degrees to allow the substance 102 to flow at different rates or to block the flow of the substance 102. The third means 130, for example, may include a rotatable or translatable portion that changes a size of a passage therethrough to varying the flow rate of the substance 102. Those skilled in the art should appreciate that any device capable of varying the flow rate of the substance 102 may be used.

In one aspect of the disclosure, which may include at least a portion of the subject matter of any of the preceding and/or following examples and aspects, the first means 122 includes any structure or device capable of moving the dispenser 110 while maintaining the contact portion 112 in communication with the surface 106 as the substance 102 is being dispensed along the path 108 in the progression direction P, as explained in further detail below. The progression direction P generally refers to the direction of travel of the dispenser 110 along the path 108 as the bead 104 is formed on the surface 106. Accordingly, as the dispenser 110 is moved in the progression direction (illustrated as left to right in FIG. 2), the bead 104 is formed on the surface 106 as the substance 102 interacts with the trailing edge 120 of the dispenser 110. For example, as the substance 102 is dispensed and the dispenser 110 is moved along the path 108 in the progression direction P, the shape of the bead 104 is defined by the trailing edge 120 as the trailing edge 120 moves past the substance 102 that has been previously dispensed on the surface 106 in front of the trailing edge 120. In one or more examples, the trailing edge 120 is a fairing edge that fully defines the cross-sectional shape of the bead 104.

By controlling the movement of the dispenser 110, including at least the speed that the dispenser 110 is moved along the surface 106 by the first means 122, a desired or required size and/or shape of the bead 104 is formed by the trailing edge 120. In one example, with the dispenser 110 in contact with the surface 106 while dispensing the substance 102, a speed of the dispenser 110 is varied, and alternatively or additionally, a flow rate of the substance supplied to the dispenser 110 is varied, to form the substantially uniform cross-sectional shape of the bead 104 along the path 108.

Figure 3:
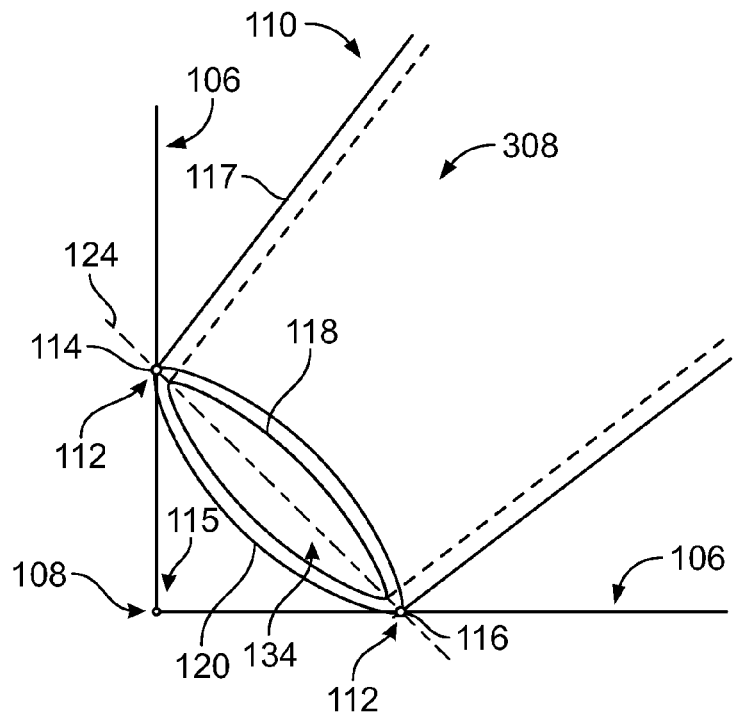
Figure 4:
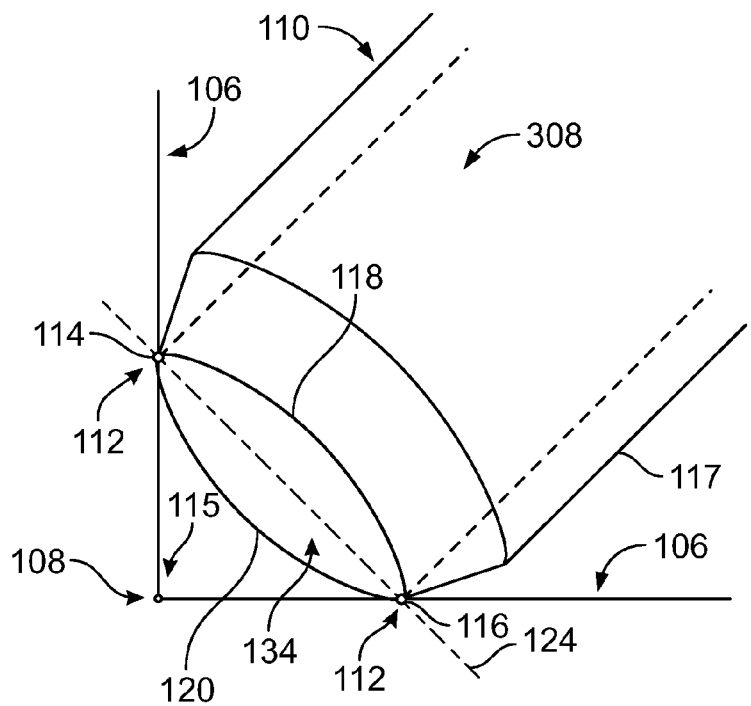

The dispenser 110, including the different portions thereof, such as the leading edge 118 and trailing edge 120, may be shaped and sized as desired or needed, so as to provide a particular dispensing characteristic or property. In some examples, the dispenser 110 is a nozzle including the contact portion 112. In one example (FIG. 3), the surface 106 has an inside corner 115 and the contact portion 112 includes contact points 114, 116 that delimit the trailing edge 120 and are in contact with the surface 106 when the dispenser 110 is oriented with a leading angle relative to the surface 106 in the progression direction P (directed out of the page in the view of FIG. 3) along the path 108. Those skilled in the art will appreciate that, as used herein, contact points 114, 116 refer to physical locations or spots, rather than entities having a position in space, but no extent. As shown in FIG. 3, the leading edge 118 and the trailing edge 120 extend along different circumferential portions of an annular surface defining an opening 134 formed at the tip of the dispenser 110 and through which the substance 102 is dispensed. In another example, illustrated in FIG. 4, the dispenser 110 is a nozzle having a tip which is tapered such that the leading edge 118 and the trailing edge 120 both extend along a knife edge of an annulus defining the opening 134 at the tip of the dispenser 110. In the examples of FIGS. 3 and 4, contact portion 112 (namely the contact points 114, 116) and the trailing edge 120 provide a fixed containment geometry for the dispensed substance 102. The opening 134 forms an exit of a substance supply passage 308 along which the substance 102 flows through the dispenser 110. The substance supply passage 308 may be sized and shaped to help deliver a flow of the substance 102 desired or needed for the particular application.

Figure 6:
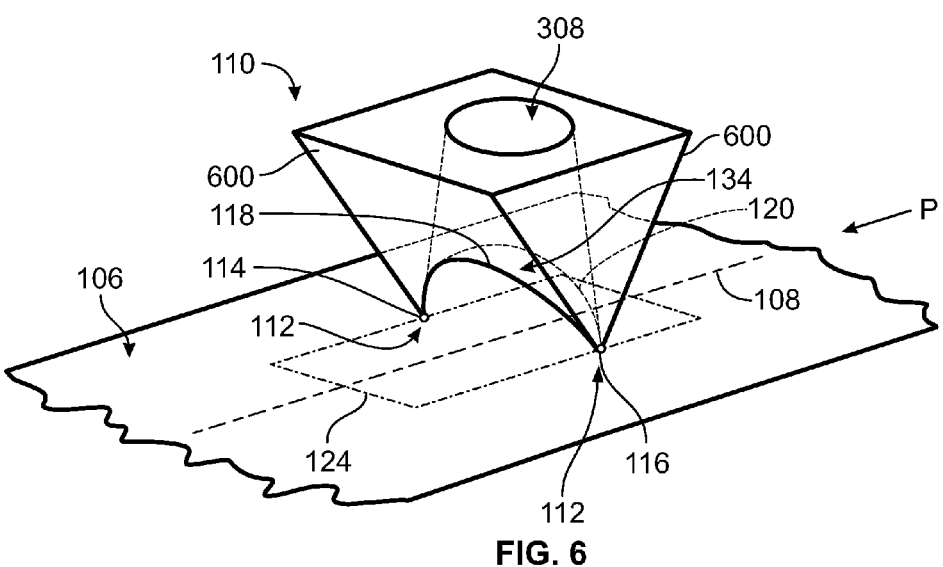

In some examples, such as shown in FIG. 6, the dispenser 110 is a wedge-shape structure with the opening 134 bounded by the leading edge 118 and the trailing edge 120, both of which are arcuate. Opposing leading and trailing outer walls 600 of the dispenser 110 converge toward the bottom of the dispenser 110 (as viewed in FIG. 6). The leading edge 118 and the trailing edge 120 are delimited by the contact points 114, 116. Those skilled in the art will appreciate that the leading edge 118 and the trailing edge 120 in this and other examples of the disclosure need not necessarily be arcuate and may have any number of shapes.

In other aspects, the opening 134, which is in communication with the substance-supply passage 308, may be only partially bounded by at least one of the leading edge 118 or the trailing edge 120, or not bounded by any of the leading edge 118 and the trailing edge 120. The substance supply passage 308 may have a constant or a variable (e.g., tapering) cross-section along the length thereof. In the example of FIG. 6, the contact portion 112 (namely the contact points 114, 116) and the trailing edge 120 provide a fixed containment geometry for the dispensed substance 102.

Figure 5:
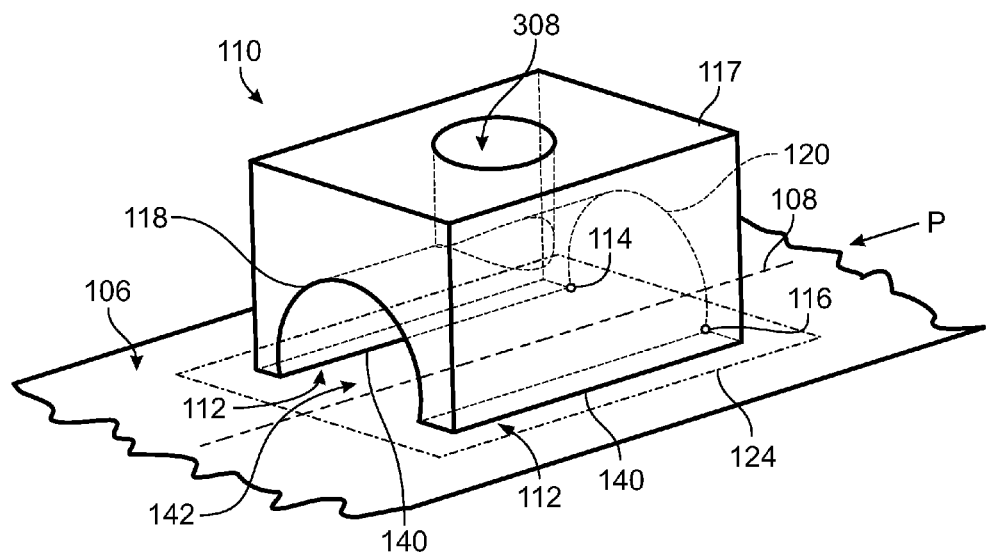

Referring, e.g., to FIG. 5, in one aspect of the disclosure, which may include at least a portion of the subject matter of any of the preceding and/or following examples and aspects, the contact portion 112 of the dispenser 110 includes at least an edge 140. In the illustrated example, two edges 140 define the contact portion 112. The edges 140 extend from the trailing edge 120, which is bounded by contact points 114 and 116, to the leading edge 118 of the dispenser 110. The leading edge 118 and the trailing edge 120 are in communication with the substance-supply passage 308 via, e.g., a channel 142, through which the substance 102 is dispensed onto the surface 106 after passing through the substance-supply passage 308. Those skilled in the art will appreciate that in some examples a channel, such as the channel 142, may not be provided, and that the substance-supply passage 308 may be shaped to be partially bounded by the leading edge 118 and the trailing edge 120. In the example of FIG. 5, the contact portion 112 (more specifically, the edges 140) and the trailing edge 120 provide a fixed containment geometry for the dispensed substance 102.

Referring once again to FIG. 5, in one aspect of the disclosure, which may include at least a portion of the subject matter of any of the preceding and/or following examples and aspects, the at least one edge 140 of the contact portion 112 is linear. Those skilled in the art will appreciate that when both edges 140 are linear, they may lie in a plane and be parallel or non parallel to each other. The dispenser 110 having linear edges 140 may be utilized when the substance 102 is deposited on, e.g., a flat surface, along a lap joint, etc.

The first means 122 is configured to maintain the contact portion 112 in contact or abutting engagement with the surface 106 so that the contact portion 112 and the trailing edge 120 provide a fixed containment geometry for the dispensed substance 102. The first means 122 may be, for example, a robotic arm or another mechanical or electro-mechanical manipulator or actuation device that is controllable to support the dispenser 110 and to move the dispenser 110 relative to the surface 106. It should be noted that the path 108 of the dispenser 110 along the surface 106 may be configured to follow, e.g., edges, corners, seams of joints (such as lap joints), or other surface variations, contours, and features. For example, the path 108 may be defined along at least a portion of the surface 106 and may be a continuous or an interrupted path. In one aspect of the disclosure, which may include at least a portion of the subject matter of any of the preceding and/or following examples and aspects, the path 108 is linear, such as, for example, along a linear seam of a lap joint. Alternatively, the path 108 may be non-linear, such as, for example, along a curved seam of a corner joint between a flat surface and an arcuate surface. It should be appreciated that in some examples, some portions of the path 108 may be linear, while other portions of the path 108 may be non-linear. The entire path 108 or portions thereof may or may not lie in a plane.

In one aspect of the disclosure, which may include at least a portion of the subject matter of any of the preceding and/or following examples and aspects, the second means 126 monitors the leading portion 128 of the bead 104, which in some examples includes a portion of the substance 102 forward of the leading edge 118 of the dispenser 110. The second means 126 may be any type of sensor, such as a monitoring or vision device or system that allows for monitoring the location of the substance 102 relative to the dispenser 110 along the path 108 while the substance 102 is being dispensed. In one example, the second means is a camera that captures images of the substance 102 as the substance 102 is being dispensed. For example, a video stream or series of still images may be generated by the second means 126. In one example, the second means 126 is a non-vision sensor system that does not capture images of the substance 102. The second means 126 in some examples may be a fiber-optic system, an optical sensor, a radar system, or an ultrasonic sensor, among others. Thus, the second means 126 may be a vision system, non-vision system, or a combination thereof.

The second means 126 may be coupled to the dispenser 110 in some examples, such as to a body 117 of the dispenser 110. However, in other examples, the second means 126 is separately and independently supported or may be coupled to a different portion of the system 100. The second means 126 may be fixedly coupled or movably coupled in some examples, such as to the first means 122, fourth means 132, or other support structure.

In one aspect of the disclosure, which may include at least a portion of the subject matter of any of the preceding and/or following examples and aspects, and with particular reference to FIG. 7, the leading portion 128 of the bead 104 includes a leading surface 700 that includes a forward-most point 702 in the progression direction P along the path 108. In one example, the forward-most point 702 is the point of the substance 102 that is a farthest distance from the dispenser 110. As described in more detail herein, the leading portion 128 is monitored to maintain the leading portion 128 within a distance range of the dispenser 110. For example, as shown in FIG. 7, the absence of the leading portion 128 beyond the leading edge 118, or the failure of the leading portion 128 to reach a minimum level in front of the leading edge 118 of the dispenser 110 in the progression direction P, may indicate an underfill condition. When the underfill condition exists, a gap may be present between the dispenser 110 and the substance 102, resulting in an overly narrow bead 104 at the trailing edge 120 of the dispenser 110. As also shown in FIG. 7, the extension of the leading portion 128 beyond a maximum level may indicate an overflow condition, which may result in an overly large or uncontrolled bead 104 and wasted material.

In one aspect of the disclosure, which may include at least a portion of the subject matter of any of the preceding and/or following examples and aspects, and with particular reference to FIG. 9, the leading surface 700 (as seen in FIG. 7) includes a first lateral-most point 902 in a first virtual plane 906 along the virtual travel plane 124 and a second lateral-most point 904 in a second virtual plane 908 along the virtual travel plane 124. As used herein, "along" means parallel to or in line with a length or direction. Thus, in one aspect, the first virtual plane 906 and second virtual plane 908 may be co-planar with the virtual travel plane 124. In another aspect, one or both of the first virtual plane 906 or the second virtual plane 908 may be parallel to, but spaced a distance from, the virtual travel plane 124. The lateral-most points 902 and 904 are the points on the leading surface 700 that are the farthest laterally from a centerline of the dispenser 110. In FIG. 9, the lateral-most points are in the plane of the leading edge 118; however, the lateral-most points may be located in front of the leading edge 118 in some examples. The lateral-most points 902 and 904 may be used, for example, to monitor the leading surface 700 of the bead 104.

In one aspect of the disclosure, which may include at least a portion of the subject matter of any of the preceding and/or following examples and aspects, the first virtual plane 906 and the second virtual plane 908 coincide, such as when the first lateral-most point 902 and the second lateral-most point 904 are co-planar. In one aspect of the disclosure, which may include at least a portion of the subject matter of any of the preceding and/or following examples and aspects, the first virtual plane 906 and the second virtual plane 908 do not coincide, such as when the first lateral-most point 902 and the second lateral-most point 904 are not co-planar. For example, the first lateral-most point 902 and second lateral-most point 904 may be located at different distances relative to the virtual travel plane 124.

Additionally, as used herein, "virtual plane" refers to an imaginary plane in space, which may be defined and used to control the dispensing of the substance 102. It should be appreciated the leading edge 118 and the trailing edge 120 of the dispenser 110 terminate in the virtual travel plane 124. In other words, the end points of the leading edge 118 always lie in the virtual travel plane 124 and the end points of the trailing edge 120 (the contact points 114, 116) also lie in the virtual travel plane 124.

The leading portion 128 of the bead 104 may include one or more different characteristics which may be monitored by the second means 126. In one aspect of the disclosure, which may include at least a portion of the subject matter of any of the preceding and/or following examples and aspects, and with particular reference to FIGS. 3-7 and 9, at least one characteristic of the leading portion 128 includes a shortest lateral distance L1 (shown in FIG. 9) between a location 303 on the dispenser 110 and a third virtual plane 300 parallel to the path 108, perpendicular to the virtual travel plane 124, and containing one of the first lateral-most point 902 or the second lateral-most point 904. In one aspect of the disclosure, which may include at least a portion of the subject matter of any of the preceding and/or following examples and aspects, the shortest lateral distance L1 between the location 303 on the dispenser 110 and the third virtual plane 300 is a first shortest lateral distance, and wherein the at least one characteristic of the leading portion 128 further includes a second shortest lateral distance L2 between the location 303 on the dispenser 110 and a fourth virtual plane 302 parallel to the path 108, perpendicular to the virtual travel plane 124, and containing the other one of the first lateral-most point 902 and the second lateral-most point 904. It may be noted that the location 303 is shown in FIG. 9 as being located proximate the leading edge 118 and near a lateral edge of the dispenser 110, but may be located elsewhere in various embodiments.

In one aspect of the disclosure, which may include at least a portion of the subject matter of any of the preceding and/or following examples and aspects, and with particular reference to FIGS. 2, 7 and 9, the at least one characteristic of the leading portion 128 is a shortest lengthwise distance L3 between the location 303 on the dispenser 110 and a virtual cross-plane 306 perpendicular to the path 108 and containing the forward-most point 702 of the leading surface 700. It may be noted that the location 303 is shown in FIG. 9 as being located proximate the leading edge 118 but may be located elsewhere in various embodiments. It may further be noted that, as seen in FIG. 9, the same location 303 is used for distances L1 and L2 as well as for L3. However, in various embodiments, for example, a first location may be used for measuring L1 and L2 while a second, different location is used for measuring L3. Thus, in some examples, different distances of one or more portions of the bead 104 may be monitored with respect to the dispenser 110. The location on the dispenser 110 may be selected, for example, to facilitate monitoring within a view range of the second means 126 (e.g., within a camera view range).

The characteristic that is monitored may be different in various aspects. In one aspect of the disclosure, which may include at least a portion of the subject matter of any of the preceding and/or following examples and aspects, and with particular reference to FIG. 2, the at least one characteristic of the leading portion 128 is a maximum height (H) of the leading portion 128 relative to a point on the surface 106. Thus, as the substance 102 is dispensed, a vertical height of the buildup of the substance 102 may be monitored. In one aspect of the disclosure, which may include at least a portion of the subject matter of any of the preceding and/or following examples and aspects, the at least one characteristic of the leading portion 128 is a volume of the leading portion 128. Thus, as the substance 102 is dispensed, the length, height, and width defining a buildup of the substance 102 may be monitored. The different characteristics of the monitoring and the control of dispensing are further discussed with reference to a method 1000 shown in FIG. 10.

Referring generally to FIGS. 1-8 and in particular to FIG. 10, one example of the present disclosure relates to a method 1000 of dispensing the substance 102 in the form of the bead 104 on the surface 106 in the progression direction P along the path 108. The method 1000 includes supplying the substance 102 to the dispenser 110. While the substance 102 is being dispensed (operation 1002), the dispenser 110 has the contact portion 112 including the two contact points 114, 116 with the surface 106, the leading edge 118, and the trailing edge 120 extending between the two contact points 114, 116 and terminating therein (as illustrated in FIGS. 2-6). The method 1000 also includes moving the dispenser 110 along the virtual travel plane 124 which is parallel to the path 108 and passes through the two contact points 114, 116, while maintaining the contact portion 112 of the dispenser 110 in communication with the surface 106 as the substance 102 is being dispensed (operation 1004). The method 1000 also includes monitoring the leading portion 128 of the bead 104 and generating a signal responsive to at least one characteristic of the leading portion 128 with the leading portion 128 located ahead of a portion of the leading edge 118 in the progression direction P along the path 108 (operation 1006). The method 1000 additionally includes controlling, responsive to the signal generated responsive to the at least one characteristic of the leading portion 128, at least one of a speed of the dispenser 110 along the path 108 or a flow rate of the substance 102 to the dispenser 110 to provide a substantially uniform cross-sectional shape of the bead 104 along the path 108 (operation 1008).

For example, a predefined extent of the at least one characteristic of the leading portion 128 may be monitored within a distance range 704 in front of the dispenser 110 as illustrated in FIG. 7. The distance range 704 may be predetermined and define a region that is front of the dispenser 110 (or a portion thereof) along the path 108 in the progression direction P. It should be noted that the distance range 704 the illustrated example is not immediately adjacent the front of the dispenser 110, but is spaced a distance from a front of the dispenser 110. The spacing that defines the start of the distance range 704 may be defined based on the application or operating characteristics of the system 100, such as the speed range of the dispenser 110. Similarly, the distance between the minimum level (Min level) and maximum level (Max level) as illustrated in FIG. 8 may be varied.

For example, the controlled dispensing provides a substantially uniform cross-sectional shape of the bead 104 on the surface 106 that reduces the likelihood of over dispensing or under-dispensing that can result in beads 104 that would require removal and reapplication of the substance 102. In applications where the substance 102 has a fast cure rate, it becomes even more difficult to remove any improperly dispensed substance 102 before hardening occurs, which is reduced or minimized when using the system 100. Additionally, the controlled dispensing allows for forming the bead 104 that has a substantially uniform cross-sectional shape without the use of flow meters that can create issue of interference when used.

The second means 126 may be oriented or positioned to monitor one or more regions 800 (as shown in FIG. 8), thereby defining monitoring regions in front of the dispenser 110 in the progression direction P, which are used to change the adjustable speed of the dispenser 110 along the surface 106 (e.g., a workpiece) and/or a flow rate of the supplied substance 102 based on detection of the leading surface 700 in one or more of the plurality regions 800. By monitoring the leading surface 700 while the dispenser 110 is in contact with the surface 106 and dispensing the substance 102, thereby defining the fixed containment geometry, different conditions or states of the bead 104 may be determined and used to control the speed of the dispenser 110 and/or flow of substance to the dispenser 110. For example, as can be seen in FIG. 7, when the leading surface 700 is located below the Min level as viewed in the leftmost illustration of FIG. 7, the dispensing of the substance 102 is at an unacceptable low level and the desired uniform cross-sectional shape of the bead 104 is not maintained.

As can further be seen in FIG. 7, when the leading surface 700 is located at the Min level as viewed in FIG. 7, the dispensing of the substance 102 is at an acceptable low level. When the leading surface 700 is located at the Max level as viewed in the illustration of FIG. 7, the dispensing of the substance 102 is at an acceptable high level. Additionally, when the leading surface 700 is between the Min level and Max level, the dispensing of the substance 102 is also at an acceptable level. However, if leading surface 700 is located beyond the Max level as viewed in the right illustration of FIG. 7, the dispensing of the substance 102 is at an unacceptable level, illustrated as an overflow level resulting in excess substance being dispensed along sides of the bead 104 (illustrated by the substance 102 to the left and right of the bead 104, which is being dispensed out of the front end of the dispenser 110), resulting in waste of the substance 102. The dispensing of this excess substance 102 is reduced or minimized by controlling the speed of the dispenser 110 along the surface 106 and/or the flow rate of the substance to the dispenser 110 based on monitoring the one or more characteristics of the leading surface 700.

Thus, the leading surface 700 is monitored and used to control the speed of the dispenser 110 along the surface 106 and/or the flow rate of the substance to the dispenser 110 such that the leading surface 700 is maintained between the Min level and the Max level. By maintaining the leading portion within the distance range 704 defining the predefined extent, using one or more monitored characteristics of the leading portion 128, including the leading surface 700, a substantially uniform cross-sectional shape of the bead 104 is maintained, including when using the substance 102 having a non-consistent viscosity.

The distance range 704 may be set to a range of predetermined values. For example, the values may be set based on previous knowledge of dispensing arrangements or applications and the range at which a substantially uniform cross-sectional shape of the bead 104 long the path 108 was maintained. However, other methods may be used to set the distance range 704, such as modeling or using empirical data.

The controlling (operation 1008) may include increasing or decreasing the speed of the dispenser 110 along the path 108 and/or increasing or decreasing the flow rate of the substance 102 to the dispenser 110 based on the at least one characteristic of the leading portion 128 that is monitored as discussed in more detail herein. In one example, if a capacity of one or more control operations, such as if the speed of the dispenser 110 or flow rate to the dispenser 110 reaches a maximum, the other control may be adjusted, thereby acting as a backup control in some examples.

In one aspect of the disclosure, which may include at least a portion of the subject matter of any of the preceding and/or following examples and aspects, controlling at least one of the speed of the dispenser 110 along the path 108 or the flow rate of the substance 102 to the dispenser 110 (operation 1008) includes at least one of decreasing the speed of the dispenser 110 along the path 108 or increasing the flow rate of the substance 102 to the dispenser 110 if the shortest lateral distance L1 is below the predefined extent (operations 1010, 1022). In this aspect of the disclosure, the predefined extent is a range of predetermined values.

In one aspect of the disclosure, which may include at least a portion of the subject matter of any of the preceding and/or following examples and aspects, controlling at least one of the speed of the dispenser 110 along the path 108 or the flow rate of the substance 102 to the dispenser 110 includes at least one of increasing the speed of the dispenser 110 along the path 108 or decreasing the flow rate of the substance 102 to the dispenser 110 if the shortest lateral distance L1 between the location 303 on the dispenser 110 and the third virtual plane 300 is above the predefined extent (operations 1010, 1020). Thus, the speed at which the dispenser 110 is moved or the flow rate of the substance 102 to the dispenser 110 is controlled to maintain the leading portion 128 within the predefined extent, such as defined by the distance range 704. For example, by using the third virtual plane 300, the flow rate of the substance 102 is controlled to prevent or reduce the likelihood of an overflow or underflow condition.

For example, the first means 122 is controlled to adjust the speed of the dispenser 110 based on the leading portion 128 being monitored by the second means 126 and/or the flow rate of the substance through the substance supply passage 308 is controlled to maintain the leading portion 128 in a position between the Max level and Min level to provide the substantially uniform cross-sectional shape of the bead 104 along the path 108. For example, as the leading portion 128 approaches one of the threshold values defining the Min level and Max level, the speed at which the dispenser 110 is moved and/or the flow rate of the substance 102 to the dispenser 110 is adjusted, which may be adjusted, for example, incrementally until the leading portion 128 is no longer approaching one of the thresholds and/or is moving away from one of thresholds (so as to not exceed the threshold). Thus, a feedback arrangement in some examples may be provided that is continuously monitored to maintain the leading portion 128 within the predefined extent. As the leading portion 128 approaches one of the thresholds of the predefined extent or exceeds one of thresholds, the speed at which the dispenser 110 is moved or the flow rate of the substance 102 to the dispenser 110 may be changed more rapidly or in larger increments to maintain the leading portion 128 within the predefined extent or to return the leading portion 128 back into the predefined extent. Accordingly, a control arrangement with feedback is provided in one example that includes dynamic adjustment of the speed at which the dispenser 110 is moved or the flow rate that the substance 102 is dispensed to the dispenser 110 using information relating to the monitored leading portion 128, such as at least one characteristic of the leading portion 128. As discussed herein in connection with one or more of the examples, the characteristic may be related to a position or location of the leading portion 128 or a property or characteristic of the leading portion 128. It should be appreciated that other characteristics may be used and that one or more of the characteristics described herein may be combined to control the speed at which the dispenser 110 is moved and/or adjust the flow rate of the substance 102 to the dispenser 110.

In one aspect of the disclosure, which may include at least a portion of the subject matter of any of the preceding and/or following examples and aspects, controlling at least one of the speed of the dispenser 110 along the path 108 or the flow rate of the substance 102 to the dispenser 110 includes at least one of decreasing the speed of the dispenser 110 along the path 108 or increasing the flow rate of the substance 102 to the dispenser 110 if at least one of the first shortest lateral distance L1 or the second shortest lateral distance L2 is below a predefined extent and none of the first shortest lateral distance L1 and the second shortest lateral distance L2 is above the predefined extent (operations 1012, 1022). For example, defined or predetermined distances may be set and used to control the speed of the dispenser 110 or the flow rate of the substance 102 to the dispenser 110. When one of the shortest lateral distances is below the predefined extent, the uniform cross-section of the bead 104 may be lost with a non-uniform bead 104 resulting. In some applications, a non-uniform bead 104 is unacceptable and then must be replaced. In one aspect of the disclosure, the predefined extent is a range of predetermined values.

In one aspect of the disclosure, which may include at least a portion of the subject matter of any of the preceding and/or following examples and aspects, controlling at least one of the speed of the dispenser 110 along the path 108 or the flow rate of the substance 102 to the dispenser 110 includes at least one of increasing the speed of the dispenser 110 along the path 108 or decreasing the flow rate of the substance 102 to the dispenser 110 if at least one of the first shortest lateral distance L1 or the second shortest lateral distance L2 is above a predefined extent (operations 1012, 1020). Thus, the speed of the dispenser 110 and/or the flow rate of the substance 102 to the dispenser 110 is controlled to maintain substance within the predefined extent, such as to ensure that the dispenser 110 is not moved too fast or the substance 102 dispensed too slow, resulting in an underfill condition (as viewed in FIG. 8), or that that the dispenser is not moved too slow of the substance dispensed too fast, resulting in an overflow condition (as viewed in FIG. 8).

Thus, plural relative distances between the leading portion 128 and the dispenser 110 are used to control the speed at which the dispenser 110 is moved and/or the flow rate of the substance 102 to the dispenser 110. It should be appreciated that additional distances, such as relative distances between points on the leading portion 128 and the dispenser 110 may be used to control the speed at which the dispenser 110 is moved or the flow rate of the substance 102 to the dispenser 110.

In one aspect of the disclosure, which may include at least a portion of the subject matter of any of the preceding and/or following examples and aspects, controlling at least one of the speed of the dispenser 110 along the path 108 or the flow rate of the substance 102 to the dispenser 110 includes at least one of decreasing the speed of the dispenser 110 along the path 108 or increasing the flow rate of the substance 102 to the dispenser 110 if the shortest lengthwise distance L3 is below a predefined extent (operations 1014, 1022). In one aspect of the disclosure, the predefined extent is a range of predetermined values.

In one aspect of the disclosure, which may include at least a portion of the subject matter of any of the preceding and/or following examples and aspects, controlling at least one of the speed of the dispenser 110 along the path 108 or the flow rate of the substance 102 to the dispenser 110 includes at least one of increasing the speed of the dispenser 110 along the path 108 or decreasing the flow rate of the substance 102 to the dispenser 110 if the shortest lengthwise distance L3 is above a predefined extent (operations 1014, 1020). Thus, different virtual planes may be defined to maintain the leading portion 128 within the predefined extent by using distances that account for the orientation (e.g., angle or rotation) and position of the dispenser 110 relative to the surface 106 and along the path 108. Because the dispenser 110 configuration, orientation, and position may be varied, including during the dispensing, one or more aspects monitor the leading portion 128 relative to different virtual planes to ensure the proper positioning of the leading portion 128 within the predefined extent to provide the substantially uniform cross-sectional shape of the bead 104 along the path 108. For example, one or more virtual planes may be defined based on the particular application, which may include the substance 102 being dispensed, the configuration of the surface 106, and the configuration of the path 108, among others.

In one aspect of the disclosure, which may include at least a portion of the subject matter of any of the preceding and/or following examples and aspects, controlling at least one of the speed of the dispenser 110 along the path 108 or the flow rate of the substance 102 to the dispenser 110 includes at least one of decreasing the speed of the dispenser 110 along the path 108 or increasing the flow rate of the substance 102 to the dispenser 110 if the maximum height H of the leading portion 128 is below a predefined extent (operations 1016, 1022). In one aspect of the disclosure, the predefined extent is a range of predetermined values.

In one aspect of the disclosure, which may include at least a portion of the subject matter of any of the preceding and/or following examples and aspects, the method 1000 includes controlling at least one of the speed of the dispenser 110 along the path 108 or the flow rate of the substance 102 to the dispenser 110 includes at least one of increasing the speed of the dispenser 110 along the path 108 or decreasing the flow rate of the substance 102 to the dispenser 110 if the maximum height (H) of the leading portion 128 is above a predefined extent (operations 1016, 1020). In one aspect, the predefined extent is a range of predetermined values.

For example, the predefined extent, which may be defined by the Max level, sets a maximum height of the leading portion 128, for example, a height above the surface 106. The second means 126 may be calibrated such that monitoring information relating to the leading portion 128 may be used to determine the height. For example, if the monitoring information is image data from a video camera, using the known imaging properties of the video camera (e.g., zoom), a distance from the surface 106 to the top of the leading portion 128 may be automatically determined. In non-vision systems, a difference between a measured location of the surface 106 and the top of the leading portion 128 may be used to determine the height of the leading portion 128. It should be appreciated that plural locations along a top of the leading portion 128 may be determined and used, for example averaged, to determine a height of the leading portion 128.

In one aspect of the disclosure, which may include at least a portion of the subject matter of any of the preceding and/or following examples and aspects, controlling at least one of the speed of the dispenser 110 along the path 108 or the flow rate of the substance 102 to the dispenser 110 includes at least one of decreasing the speed of the dispenser 110 along the path 108 or increasing the flow rate of the substance 102 to the dispenser if the volume of the leading portion 128 is below a predefined extent (operations 1018, 1022). In one aspect, the predefined extent is a range of predetermined values.

In one aspect of the disclosure, which may include at least a portion of the subject matter of any of the preceding and/or following examples and aspects, the method 1000 includes controlling at least one of the speed of the dispenser 110 along the path 108 or the flow rate of the substance 102 to the dispenser 110 by at least one of increasing the speed of the dispenser 110 along the path 108 or decreasing the flow rate of the substance 102 to the dispenser 110 if the volume of the leading portion 128 is above a predefined extent (operations 1018, 1020). In one aspect of the disclosure, the predefined extent is a range of predetermined values.

For example, the predefined extent, which may be defined by the Max level, sets a maximum volume of the leading portion 128, for example, based on a monitored and measured length, width, and height of the leading portion 128. The second means 126 may be calibrated such that monitoring information relating to the leading portion 128 may be used to determine the volume. For example, if the monitoring information is image data from a video camera, using the known imaging properties of the video camera (e.g., zoom), different distances from the surface 106 to the points of the leading portion 128 may be automatically determined. In non-vision systems, a difference between measured locations of the surface 106 and different points of the leading portion 128 may be used to determine the volume of the leading portion 128. It should be appreciated that plural locations along the top and sides of the leading portion 128 may be determined and used, for example averaged, to determine a volume of the leading portion 128.

In one aspect of the disclosure, which may include at least a portion of the subject matter of any of the preceding and/or following examples and aspects, controlling at least one of the speed of the dispenser 110 along the path 108 or the flow rate of the substance 102 to the dispenser 110 (operation 1008) includes reducing the flow rate when the speed of the dispenser 110 is increased to a maximum responsive to the signal generated responsive to the at least one characteristic of the leading portion 128. For example, if the speed of the dispenser 110 can no longer be increased (at maximum speed) to maintain the leading portion 128 within the predefined extent, the flow rate is reduced. In this way, even if a maximum speed of the dispenser 110 is reached, the leading portion 128 may still be maintained within the predefined extent. The change in the flow rate may be varied based on how close the leading portion 128 is to the threshold (or if the threshold has been exceeded) of the predefined extent or how close the dispenser 110 is to the maximum speed. For example, the change in flow may be more rapidly performed based on the monitored characteristic(s) of the leading portion 128. Various different aspects may be provided optionally or alternatively with the method 1000. In one aspect of the disclosure, which may include at least a portion of the subject matter of any of the preceding and/or following examples and aspects, monitoring the leading portion 128 of the bead 104 (operation 1004) includes monitoring at least one region forward of the leading edge 118 of the dispenser 110 in the progression direction P along the path 108 in at least one region 800.

In this aspect of the disclosure, which may include at least a portion of the subject matter of any of the preceding and/or following examples and aspects, and with particular reference to FIG. 8, controlling at least one of the speed of the dispenser 110 along the path 108 or the flow rate of the substance 102 to the dispenser 110 (operation 1008) includes changing at least one of the speed of the dispenser 110 along the path 108 or the flow rate of the substance 102 to the dispenser 110 based on a location of at least a part of the leading portion 128 of the bead 104 relative to the at least one region 800. If a plurality of regions 800 are used, the monitored information, such as the location of the leading portion 128 (such as the leading surface 700 of the leading portion 128) in each of the regions 800 may be used to control the speed of the dispenser 110 along the path 108 and/or the flow rate of the substance 102 to the dispenser 110. For example, the monitored information may be averaged or weighted to determine a responsive action or signal to generate. It should be appreciated that one or more of the aspects described herein may be used to monitor the leading portion 128 in each of the regions 800. In one example, different aspects described herein may be used in different ones of the regions 800. In one example, each of the one or more regions 800 defines a monitoring area having a length and width, as well as a distance, from the location on the dispenser 110.

In one aspect of the disclosure, which may include at least a portion of the subject matter of any of the preceding and/or following examples and aspects, supplying the substance 102 to the dispenser 110 (operation 1002) includes supplying the substance 102 to the dispenser 110 at a constant flow rate. For example, only the speed of the dispenser 110 along the path 108 is adjusted, such as described in one or more aspects and the flow rate of the substance 102 to the dispenser 110 is not changed. For example, using the monitoring of the leading portion 128 in one or more aspects, only the speed of the dispenser 110 along the path 108 is adjusted to maintain the leading portion 128 within the predefined extent. Accordingly, in this aspect, once the flow rate is initially set, the flow rate is not changed while dispensing the substance 102.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 11 and an aircraft 1200 as shown in FIG. 12. During pre-production, illustrative method 1100 may include specification and design 1102 of the aircraft 1200 and material procurement 1104. During production, component and subassembly manufacturing 1106 and system integration 1108 of the aircraft 1200 take place. Thereafter, the aircraft 1200 may go through certification and delivery 1110 to be placed in service 1112. While in service by a customer, the aircraft 1200 is scheduled for routine maintenance and service 1114 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, the aircraft 1200 produced by the illustrative method 1100 may include an airframe 1202 with a plurality of high-level systems 1204 and an interior 1206. Examples of high-level systems 1204 include one or more of a propulsion system 1208, an electrical system 1210, a hydraulic system 1212, and an environmental system 1214. Any number of other systems may be included. Although an aerospace example is shown, the principles of the invention may be applied to other industries, such as the automotive industry. Accordingly, in addition to aircraft 1200, the principles disclosed herein may apply to other vehicles, e.g., land vehicles, marine vehicles, space vehicles, etc.

Apparatus and methods shown or described herein may be employed during any one or more of the stages of the manufacturing and service method 1100. For example, components or subassemblies corresponding to component and subassembly manufacturing 1106 may be fabricated or manufactured in a manner similar to components or subassemblies produced while the aircraft 1200 is in service. Also, one or more aspects of the apparatus, method, or combination thereof may be utilized during the production stages 1106 and 1108, for example, by substantially expediting assembly of or reducing the cost of an aircraft 1200. Similarly, one or more aspects of the apparatus or method realizations, or a combination thereof, may be utilized, for example and without limitation, while the aircraft 1200 is in service, e.g., maintenance and service 1114.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method of dispensing a substance in a form of a bead on a surface in a progression direction along a path, the method comprising:
   supplying the substance to a dispenser, wherein, while the substance is being dispensed, the dispenser comprises:
      a contact portion including two contact points with the surface,
      a leading edge, and
      a trailing edge extending between the two contact points and terminating therein;
   moving the dispenser along a virtual travel plane which is parallel to the path and passes through the two contact points, while maintaining the contact portion of the dispenser in communication with the surface as the substance is being dispensed;
   monitoring a leading portion of the bead and generating a signal responsive to at least one characteristic of the leading portion, wherein the leading portion is located ahead of a portion of the leading edge in the progression direction along the path; and
   controlling, responsive to the signal generated responsive to the at least one characteristic of the leading portion, at least one of a speed of the dispenser along the path or a flow rate of the substance to the dispenser to provide a substantially uniform cross-sectional shape of the bead along the path.

2. The method of claim 1, wherein the leading portion of the bead comprises a leading surface that includes a forward-most point in the progression direction along the path.

3. The method of claim 2, wherein the leading surface further comprises a first lateral-most point in a first virtual plane along the virtual travel plane and a second lateral-most point in a second virtual plane along the virtual travel plane.

4. The method of claim 3, wherein the first virtual plane and the second virtual plane coincide.

5. The method of claim 3, wherein the first virtual plane and the second virtual plane do not coincide.

6. The method of claim 3, wherein the at least one characteristic of the leading portion includes a shortest lateral distance between a location on the dispenser and a third virtual plane parallel to the path, perpendicular to the virtual travel plane, and containing one of the first lateral-most point and the second lateral-most point.

7. The method of claim 6, wherein controlling at least one of the speed of the dispenser along the path or the flow rate of the substance to the dispenser comprises at least one of decreasing the speed of the dispenser along the path or increasing the flow rate of the substance to the dispenser if the shortest lateral distance is below a predefined extent.

8. The method of claim 7, wherein the predefined extent is a range of predetermined values.

9. The method of claim 6, wherein controlling at least one of the speed of the dispenser along the path and the flow rate of the substance to the dispenser comprises at least one of increasing the speed of the dispenser along the path and decreasing the flow rate of the substance to the dispenser if the shortest lateral distance is above a predefined extent.

10. The method of claim 9, wherein the predefined extent is a range of predetermined values.

11. The method of claim 6, wherein the shortest lateral distance between the location on the dispenser and the third virtual plane is a first shortest lateral distance, and wherein the at least one characteristic of the leading portion further includes a second shortest lateral distance between the location on the dispenser and a fourth virtual plane parallel to the path, perpendicular to the virtual travel plane, and containing the other one of the first lateral-most point and the second lateral-most point.

12. The method of claim 11, wherein controlling at least one of the speed of the dispenser along the path and the flow rate of the substance to the dispenser comprises at least one of decreasing the speed of the dispenser along the path and increasing the flow rate of the substance to the dispenser if at least one of the first shortest lateral distance and the second shortest lateral distance is below a predefined extent and none of the first shortest lateral distance and the second shortest lateral distance is above the predefined extent.

13. The method of claim 12, wherein the predefined extent is a range of predetermined values.

14. The method of claim 12, wherein controlling at least one of the speed of the dispenser along the path and the flow rate of the substance to the dispenser comprises at least one of increasing the speed of the dispenser along the path and decreasing the flow rate of the substance to the dispenser if at least one of the first shortest lateral distance and the second shortest lateral distance is above a predefined extent.

15. The method of claim 14, wherein the predefined extent is a range of predetermined values.

16. The method of claim 2, wherein the at least one characteristic of the leading portion is a shortest lengthwise distance between a location on the dispenser and a virtual cross-plane perpendicular to the path and containing the forward-most point of the leading surface.

17. The method of claim 16, wherein controlling at least one of the speed of the dispenser along the path or the flow rate of the substance to the dispenser comprises at least one of decreasing the speed of the dispenser along the path or increasing the flow rate of the substance to the dispenser if the shortest lengthwise distance is below a predefined extent.

18. The method of claim 17, wherein the predefined extent is a range of predetermined values.

19. The method of claim 16, wherein controlling at least one of the speed of the dispenser along the path or the flow rate of the substance to the dispenser comprises at least one of increasing the speed of the dispenser along the path or decreasing the flow rate of the substance to the dispenser if the shortest lengthwise distance is above a predefined extent.

20. The method of claim 19, wherein the predefined extent is a range of predetermined values.

21. The method of claim 1, wherein the at least one characteristic of the leading portion is a maximum height of the leading portion relative to a point on the surface.

22. The method of claim 21, wherein controlling at least one of the speed of the dispenser along the path or the flow rate of the substance to the dispenser comprises at least one of decreasing the speed of the dispenser along the path or increasing the flow rate of the substance to the dispenser if the maximum height of the leading portion is below a predefined extent.

23. The method of claim 22, wherein the predefined extent is a range of predetermined values.

24. The method of claim 21, wherein controlling at least one of the speed of the dispenser along the path or the flow rate of the substance to the dispenser comprises at least one of increasing the speed of the dispenser along the path or decreasing the flow rate of the substance to the dispenser if the maximum height of the leading portion is above a predefined extent.

25. The method of claim 24, wherein the predefined extent is a range of predetermined values.

26. The method of claim 1, wherein the at least one characteristic of the leading portion is a volume of the leading portion.

27. The method of claim 26, wherein controlling at least one of the speed of the dispenser along the path or the flow rate of the substance to the dispenser comprises at least one of decreasing the speed of the dispenser along the path or increasing the flow rate of the substance to the dispenser if the volume of the leading portion is below a predefined extent.

28. The method of claim 27, wherein the predefined extent is a range of predetermined values.

29. The method of claim 26, wherein controlling at least one of the speed of the dispenser along the path or the flow rate of the substance to the dispenser comprises at least one of increasing the speed of the dispenser along the path or decreasing the flow rate of the substance to the dispenser if the volume of the leading portion is above a predefined extent.

30. The method of claim 29, wherein the predefined extent is a range of predetermined values.

31. The method of claim 1, wherein monitoring the leading portion of the bead comprises monitoring at least one region forward of the leading edge of the dispenser in the progression direction along the path.

32. The method of claim 31, wherein controlling at least one of the speed of the dispenser along the path or the flow rate of the substance to the dispenser comprises changing at least one of the speed of the dispenser along the path or the flow rate of the substance to the dispenser based on a location of at least a part of the leading portion of the bead relative to the at least one region.

33. The method of claim 1, wherein supplying the substance to the dispenser comprises supplying the substance to the dispenser at a constant flow rate.

34. The method of claim 1, wherein controlling at least one of the speed of the dispenser along the path or the flow rate of the substance to the dispenser comprises reducing the flow rate when the speed of the dispenser is increased to a maximum responsive to the signal generated responsive to the at least one characteristic of the leading portion.

35. The method of claim 1, wherein the path is linear.
36. The method of claim 1, wherein the path is non-linear.
37. The method of claim 1, wherein the path is linear.
38. The method of claim 1, wherein the path is non-linear.

* * * * *